US012785186B2

(12) United States Patent
Mathieu

(10) Patent No.: US 12,785,186 B2
(45) Date of Patent: Nov. 3, 2026

(54) SEALED ELECTRIC BATTERY HOUSING

(71) Applicant: RENAULT S.A.S, Boulogne Billancourt (FR)

(72) Inventor: Alexandre Mathieu, Rouen (FR)

(73) Assignee: AMPERE S.A.S., Boulogne Billancourt (FR)

(*) Notice: Subject to any disclaimer, the term of this patent is extended or adjusted under 35 U.S.C. 154(b) by 460 days.

(21) Appl. No.: 18/555,742

(22) PCT Filed: Apr. 19, 2022

(86) PCT No.: PCT/EP2022/060312
§ 371 (c)(1),
(2) Date: Oct. 17, 2023

(87) PCT Pub. No.: WO2022/223559
PCT Pub. Date: Oct. 27, 2022

(65) Prior Publication Data

US 2024/0204314 A1 Jun. 20, 2024

(30) Foreign Application Priority Data

Apr. 19, 2021 (FR) ....................................... 2104060

(51) Int. Cl.

| | |
|---|---|
| ***H01M 50/184*** | (2021.01) |
| ***H01M 50/103*** | (2021.01) |
| ***H01M 50/186*** | (2021.01) |
| ***H01M 50/191*** | (2021.01) |
| ***H01M 50/193*** | (2021.01) |

(52) U.S. Cl.
CPC ....... *H01M 50/184* (2021.01); *H01M 50/103* (2021.01); *H01M 50/186* (2021.01); *H01M 50/191* (2021.01); *H01M 50/193* (2021.01)

(58) Field of Classification Search
CPC ............. H01M 50/103; H01M 50/183; H01M 50/184; H01M 50/186; H01M 50/19; H01M 50/191; H01M 50/193; H01M 50/195
See application file for complete search history.

(56) References Cited

U.S. PATENT DOCUMENTS

2020/0408303 A1 12/2020 Gruhler et al.
2022/0154825 A1 5/2022 Kaiser-Krug et al.

FOREIGN PATENT DOCUMENTS

| | | | |
|---|---|---|---|
| CN | 102192327 | A | 9/2011 |
| FR | 3 067 436 | A | 12/2018 |
| WO | WO 2020/208087 | A1 | 10/2020 |

OTHER PUBLICATIONS

Machine translation of FR 3067436 A1 (Year: 2018).*
International Search Report mailed on Aug. 19, 2022 in PCT/EP2022/060312 filed on Apr. 19, 2022 (9 pages).

(Continued)

*Primary Examiner* — Timothy C Cleveland
(74) *Attorney, Agent, or Firm* — Oblon, McClelland, Maier & Neustadt, L.L.P.

(57) ABSTRACT

A two-piece electric battery housing includes a lower housing and an upper housing. An EPDM seal to which a metal frame is attached is inserted between the lower housing and the upper frame to ensure good water-tightness of the obtained housing.

10 Claims, 3 Drawing Sheets

(56) References Cited

OTHER PUBLICATIONS

Preliminary French Search Report dated Nov. 29, 2021 in French Application 21 04060 filed on Apr. 19, 2021 (9 pages, with Written Opinion & Translation of Categories).
Korean Office Action issued on Apr. 29, 2026 in Korean Patent Application No. 10-2023-7038630 (with unedited computer- generated English translation), 14 pages.

* cited by examiner

SEALED ELECTRIC BATTERY HOUSING

BACKGROUND

The present invention relates to a sealed electric battery housing.

Generally, traction batteries are composed of a structural bottom housing and a non-structural top housing. The bottom housing is preferentially made of metal and constitutes a frame around the modules of said battery. The top housing ensures only the water-tightness and the tightness to electromagnetic currents.

The water-tightness between the top housing and the bottom housing can be ensured by an EPDM (ethylene-propylene-diene monomer) lip seal which is particularly well suited to this type of configuration. With the increase in the size of the batteries, these EPDM seals are becoming increasingly larger and, in order to optimize the structures, they are also becoming increasingly thinner. Now, EPDM seals that are too large and too thin are difficult to manipulate when assembling this housing.

The application CN107946515 discloses a battery housing having two housings and a lip seal, intended to be inserted between said two housings. The seal is made of EPDM and can be installed on the bottom housing of the casing. It is spread over the entire surface linking the two housings, such that it surrounds their fixing points. This solution presents, among others, the drawbacks mentioned above during assembly.

BRIEF SUMMARY

A housing of an electric battery according to the invention makes it possible to overcome the drawbacks encountered in the state-of-the-art.

The subject of the invention is an electric battery housing intended to house at least one module of said battery, said housing being produced in two parts, comprising a bottom housing having a flat joining edge and a top housing having a flat joining face, the bottom housing and the top housing being able to come to bear against one another to form the housing by means of placement of the flat joining edge in contact with the flat joining face, an EPDM seal being inserted between the flat joining edge and the flat joining face in order to render the housing seal-tight.

According to the invention, a metal frame is fixed to the EPDM seal so as to increase the rigidity of said seal, the assembly composed of the EPDM seal and the metal frame being inserted between the flat joining edge of the bottom housing and the flat joining face of the top housing.

The assembly comprising the EPDM seal and the metal frame constitutes a rigid resulting seal, having a component of rigidity through the metal frame, and a component of seal-tightness through the EPDM seal. The metal frame is embodied by a metal rod which follows the profile of the EPDM seal. This metal frame can be present, either over all of the length of the EPDM seal, or over certain sectors of said EPDM seal. The presence of this metal frame is justified, because it makes it possible to stiffen the EPDM seal, thus allowing the resulting seal to be able to be manipulated easily and with precision by robots in order to place it in its right place on the flat junction edge of the bottom housing. As an example, if the flat junction edge of the bottom housing had the form of a rectangular frame, the EPDM seal would also have the form of a rectangular frame, and the metal frame would also have the general form of a rectangular frame totally or partially accompanying said EPDM seal. The terms “bottom” and “top” denote the positioning of the two housings, when the housing containing the electric battery will be mounted in the vehicle.

According to a possible feature of the invention, on the flat junction edge, the EPDM seal occupies a central position and the metal frame occupies an off-centered position. In this way, since the flat junction edge has a certain width, the EPDM seal does not risk being separated from the flat junction edge, with the risk of no longer entirely resting on said junction edge, and therefore no longer ensuring a good seal-tightness between the bottom housing and the top housing. By placing the seal in a central position on the flat junction edge, said seal will rest entirely and securely on said junction edge. The flat junction edge has a length and a width, and the central position described above should be considered with respect to this width.

According to a possible feature of the invention, the flat junction edge of the bottom housing has several fixing points intended to cooperate with complementary fixing points of the top housing, said fixing points emerging from the flat junction edge by being aligned along a longitudinal and central axis of said junction edge, the EPDM seal gripping said fixing points. These fixing points can for example be represented by tapped cylindrical inserts, emerging from the flat junction edge. Advantageously, the EPDM seal has apertures intended for said fixing points to pass through. These fixing points, in addition to fulfilling their original function, also act as guiding elements for correctly positioning the EPDM seal on the flat junction edge.

According to a possible feature of the invention, the EPDM seal grips the fixing points in such a way that said fixing points are aligned along a longitudinal and central axis of said seal.

According to a possible feature of the invention, the EPDM seal is overmolded on the metal frame.

According to a possible feature of the invention, the length of the metal frame is less than or equal to the length of the EPDM seal. Indeed, the metal frame can have the same length as that of the EPDM seal, or have a length less than that while continuing to stiffen the EPDM seal. Indeed, it is not necessary to have a rigid frame which extends over the entire length of the EPDM seal for the robots to be able to manipulate the assembly composed of the EPDM seal and the metal frame efficiently and with precision.

According to a possible feature of the invention, the length of the metal frame is strictly less than that of the EPDM seal, so that said metal frame appears to be discontinuous along said EPDM seal. This way, the metal frame is distributed uniformly along the EPDM seal, without creating significant zones in which the seal would not be stiffened by the metal frame.

According to a possible feature of the invention, the EPDM seal has zones without any metal frame, said zones each comprising a main segment linking two zones having the metal frame, and at least one secondary segment crossing the main segment by being at right angles thereto.

According to a possible feature of the invention, each zone of the EPDM seal which has no metal frame has three parallel secondary segments crossing the main segment by being at right angles thereto. This represents a “fishbone” configuration for which a main segment of the seal is crossed by three parallel secondary segments, extending at right angles to said main segment.

According to a possible feature of the invention, the frame is produced in a metal to be chosen from among steel and aluminum. These are materials which are particularly, but not exclusively, suited to a metal frame intended to be fixed to an EPDM seal for the production of an electric battery housing according to the invention.

An electric battery housing according to the invention offers the advantage of being perfectly seal-tight while being easy and quick to manufacture, by virtue of a shrewd fixing of a metal frame to the EPDM seal. Furthermore, this housing has the advantage of continuing to have the same constant bulk as the existing ones, while being perfectly seal-tight.

BRIEF DESCRIPTION OF THE DRAWINGS

A detailed description of two preferred embodiments of an electric battery housing according to the invention is given hereinbelow, while referring to the following figures.

DETAILED DESCRIPTION

Figure 1:
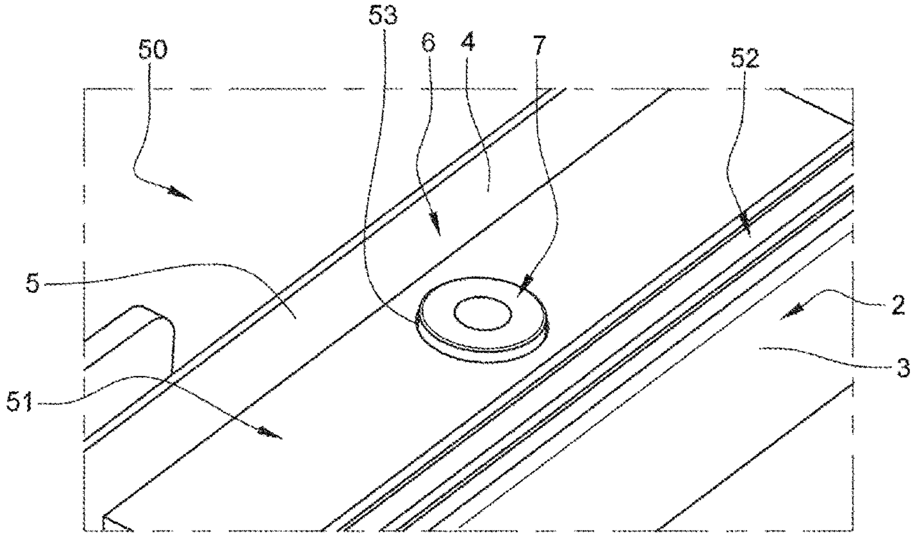
FIG. 1 represents a perspective view of a zone of a junction edge of a bottom housing for the production of a first embodiment of a housing according to the invention.

An electric battery of a motor vehicle comprises a housing in which are housed modules of said electric battery. This housing is in two parts, comprising a bottom housing 2 and a top housing, said bottom housing 2 delimiting a receptacle intended to receive the modules of the electric battery and the top housing serving as a cover intended to cap the bottom housing 2.

As a nonlimiting example, with reference to the different figures, the bottom housing 2 has a rectangular flat bottom and four flat lateral walls 3 emerging from the four peripheral edges of said rectangular bottom, said lateral walls 3 being contiguous and at right angles to said bottom. This way, the bottom housing 2 delimits an open parallelepipedal receptacle, in which the modules of the electric battery are placed. The four lateral walls 3 each have an elongate free edge 4, which is parallel to a junction line between said wall and the bottom of the bottom housing 2. The four lateral walls 3 have a constant height, said height being their dimension considered along an axis which is at right angles to the bottom of the bottom housing. This way, the four free edges of the lateral walls lie within a same plane which is parallel to said bottom. Each free edge 4 is embodied by a flat surface 5 which is parallel to the bottom of the bottom housing 2, the four flat surfaces 5 of said free edges 4 lying in a same plane and defining a flat junction edge 6 that can be likened to a flat rectangular frame.

The top housing, which is not represented in the figures, has a flat junction face intended to come into contact with the flat junction edge 6 of the bottom housing 2 to form a closed housing, housing the electric battery.

In order to ensure a good water-tightness between the bottom housing 2 and the top housing, an EPDM seal is placed on the junction edge 6 of the bottom housing, such that said seal is compressed between the bottom housing 2 and the top housing when said two housings are assembled.

Now, one problem which is often encountered with this type of seal is that said seal is long and thin, and therefore has a low rigidity making it difficult to manipulate, notably by robots, to place it correctly on the junction edge of the bottom housing 2.

A housing according to the invention resolves this problem, by fixing a metal frame to the EPDM seal, so as to obtain a resulting seal which is more rigid and therefore more easy to handle. Preferentially and in a nonlimiting manner, this metal frame is produced in steel or in aluminum. Advantageously and in a nonlimiting manner, the EPDM seal is overmolded on the metal frame.

Figure 2:
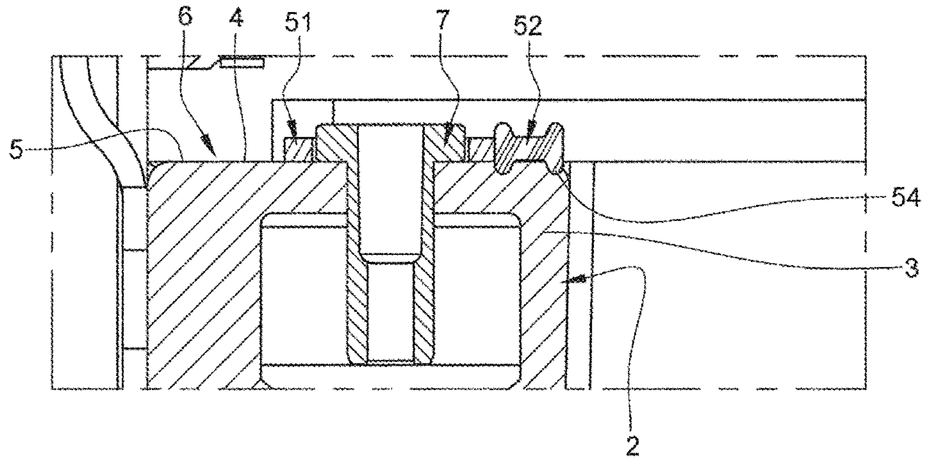
FIG. 2 represents a cross-sectional view of the zone of the junction edge of FIG. 1.
Figure 3:
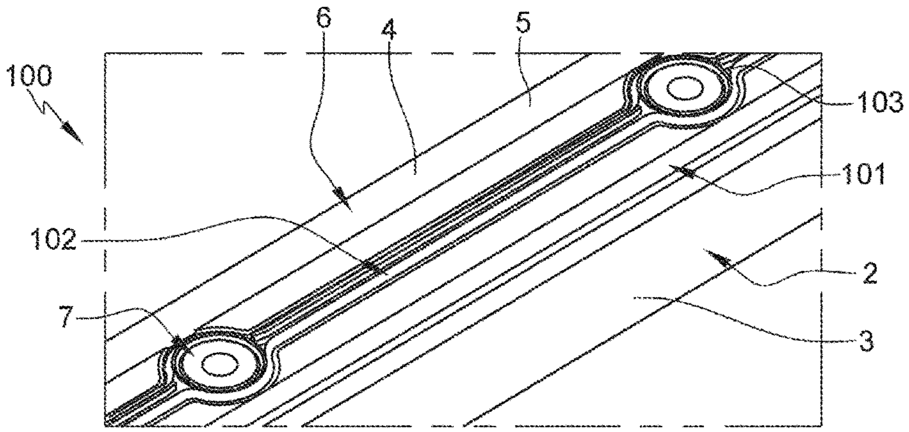
FIG. 3 represents a perspective view of a zone of a junction edge of a bottom housing for the production of a second embodiment of a housing according to the invention.

Referring to FIGS. 1 and 2, according to a first preferred embodiment of a housing 50 according to the invention, the metal frame 51 and the EPDM seal 52 extend parallel along the flat junction edge 6 of the bottom housing 2, such that said metal frame 51 is in a central position on said junction edge 6, while the EPDM seal 52 is in an off-centered position on said junction edge 6. The expressions "central position" and "off-centered position" should be considered with respect to the width of the junction edge 6. The junction edge 6 of the bottom housing 2 has fixing points 7 that are intended to cooperate with complementary fixing points of the top housing. These fixing points 7 appear in the form of cylindrical and tapped inserts, emerging from the junction edge 6. These fixing points 7 are evenly spaced apart along the junction edge 6, and are placed in a central position on said junction edge 6, considering the width of this edge 6. For the present embodiment, the metal frame 51 has, over its length, a series of circular apertures 53, the diameter of which is greater than the diameter of the inserts 7 embodying the fixing points. The metal frame 51 is therefore placed in a central position on the junction edge 6, such that each aperture 53 accommodates an insert 7. To be able to pass around these inserts 7, the metal frame 51 has a significant width, which is greater than that of the EPDM seal 52. By virtue of this significant width of the metal frame 51, the EPDM seal 52 is driven back at an end edge delimiting the width of the junction edge 6.

Referring to FIG. 2, the risk of such a configuration is that the EPDM seal 52 no longer rests entirely on the junction edge 6, and therefore no longer ensures, with full effectiveness, a good seal-tightness between the bottom housing 2 and the top housing. Indeed, as illustrated in FIG. 2, a part 54 of the EPDM seal 52 extends out of the junction edge 6, and cannot therefore be pressed completely against said flat junction edge 6. The consequences of such a configuration are that the EPDM seal 52 no longer ensures, with full effectiveness, its sealing function between the bottom housing 2 and the top housing.

Figure 4:
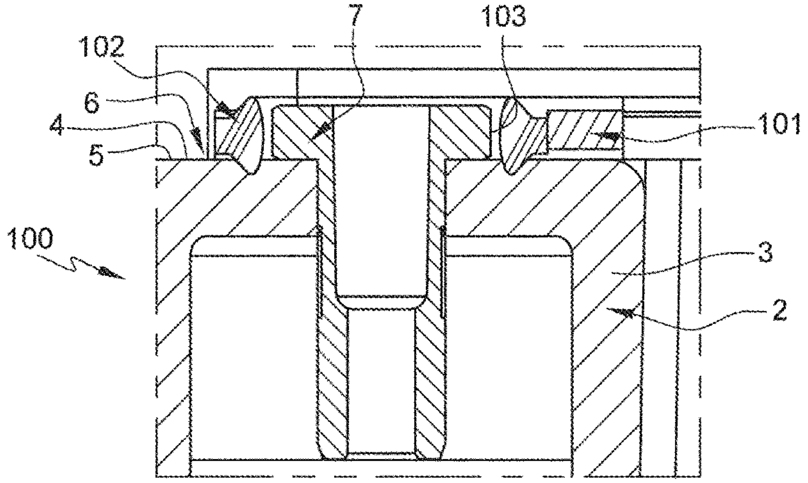
FIG. 4 represents a cross-sectional view of the zone of the junction edge of FIG. 3.
Figure 5:
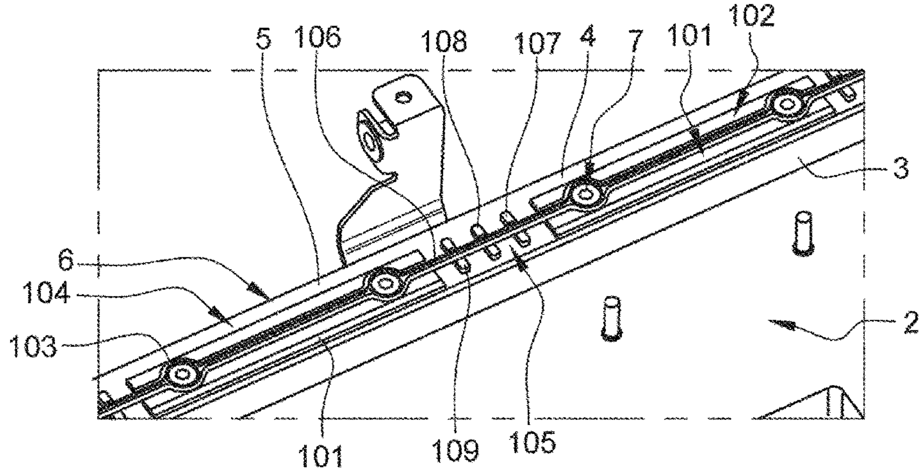
FIG. 5 represents a perspective view of a specific zone of a junction edge of a bottom housing for the production of the second embodiment of a housing according to the invention, said zone showing a discontinuous metal frame.

Referring to FIGS. 4, 5 and 6, to check that the EPDM seal 102 will rest entirely on the flat junction edge 6 of the bottom housing 2, according to a preferred second embodiment of a housing 100 according to the invention, the positions of said EPDM seal 102 and of the metal frame 101 are reversed with respect to the first embodiment previously described. Indeed, for this preferred second embodiment 100, the metal frame 101 and the EPDM seal 102 extend parallel along the flat junction edge 6 of the bottom housing 2, such that said EPDM seal is in a central position on said junction edge 6, while the metal frame 101 is in an off-centered position on said junction edge 6. The expressions "central position" and "off-centered position" should be considered with respect to the width of the junction edge 6. In this way, by being in a central position, the EPDM seal 102 will certainly rest entirely on the flat junction edge 6 of the bottom housing 2, and will fully ensure its sealing function between the bottom housing 2 and the top housing. For the present embodiment, the EPDM seal 102 has, over its length, a series of circular apertures 103, the diameter of which is greater than the diameter of the inserts 7 embodying the fixing points. The EPDM seal 102 is therefore placed in a central position on the junction edge 6, such that each aperture 103 accommodates an insert 7. To be able to pass around these inserts 7, the EPDM seal has a significant width, which is greater than that of the metal frame 101.

As illustrated in FIG. 4, the EPDM seal 102 remains completely pressed against the flat junction edge 6 of the bottom housing 2 with a certain safety margin. Indeed, in this central position, the EPDM seal 102 does not risk seeing its position deviate on the flat junction edge 6, to the point of no longer being entirely pressed against said flat junction edge 6.

Referring to FIG. 5, which relates to the preferred second embodiment of a housing 100 according to the invention, it is not necessary for the metal frame 101 to extend over all of the length of the EPDM seal 102. Indeed, it has been checked that the EPDM seal 102 could be manipulated with the same effectiveness by the robots, whether the metal frame 101 extends over all of the length of said EPDM seal 102, or whether it extends only partially along this EPDM seal 102. When the metal frame 101 does not extend over all of the EPDM seal 102, it appears preferentially discontinuous along this EPDM seal 102, such that the resulting seal formed by the EPDM seal 102 and by the metal frame 101 alternates the zones 104 with metal screen 101 and the zones 105 without metal screen 101. In the zones 105 without metal screen 101, the EPDM seal 102 takes on a particular form, consisting of a main segment 106 linking two zones 104 with metal screen 101, and three parallel secondary segments 107, 108, 109, crossing the main segment 106 by being at right angles thereto. The main segment 106 has a width which is less than that of the EPDM seal 102 in the zones 104 provided with a metal screen 101. The three secondary segments 107, 108, 109 tend to “spread” the EPDM seal 102 over the flat junction edge 6 of the bottom housing 2, in the zones 105 without any metal screen 101, to increase the sealing capabilities of said EPDM seal 102 in said zones 105.

Since the EPDM seal 102 is preferentially overmolded on the metal frame 101, the creation of zones 105 without any metal screen 101 makes it possible to use a smaller mold, because the EPDM seal 102 can then be folded in said mold, in these zones 105 without any metal screen 101. The use of a smaller mold makes it possible to considerably reduce the manufacturing costs of the assembly composed of the EPDM seal 102 and the discontinuous metal screen 101.

The invention claimed is:

1. An electric battery housing configured to house at least one module of a battery, said housing being produced in two parts, comprising:

a bottom housing having a flat junction edge and a top housing having a flat junction face, the bottom housing and the top housing being configured to come to bear against one another to form the housing via placement of the flat junction edge in contact with the flat junction face, an EPDM seal being inserted between the flat junction edge and the flat junction face to render the housing seal-tight, wherein a metal frame is fixed to the EPDM seal, and an assembly composed of the EPDM seal and the metal frame is inserted between the flat junction edge of the bottom housing and the flat junction face of the top housing, wherein the metal frame includes a plurality of circular openings, and wherein the electric battery housing includes tapped inserts extending through the circular openings such that a diameter of the circular openings is wider than a diameter of a widest part of the tapped inserts.

2. An electric battery housing configured to house at least one module of a battery, said housing being produced in two parts, comprising:

a bottom housing having a flat junction edge and a top housing having a flat junction face, the bottom housing and the top housing being configured to come to bear against one another to form the housing via placement of the flat junction edge in contact with the flat junction face, an EPDM seal being inserted between the flat junction edge and the flat junction face to render the housing seal-tight, wherein a metal frame is fixed to the EPDM seal, and an assembly composed of the EPDM seal and the metal frame is inserted between the flat junction edge of the bottom housing and the flat junction face of the top housing, and wherein, on the flat junction edge, the EPDM seal occupies a central position and the metal frame occupies an off-centered position.

3. The electric battery housing as claimed in claim 2, wherein the flat junction edge of the bottom housing has several fixing points configured to cooperate with complementary fixing points of the top housing, said fixing points emerging from the junction edge by being aligned along a longitudinal and central axis of said junction edge, and the EPDM seal passes around said fixing points by gripping them.

4. The electric battery housing as claimed in claim 3, wherein the EPDM seal grips the fixing points in such a way that said fixing points are aligned along a longitudinal and central axis of said seal.

5. The electric battery housing as claimed in claim 1, wherein the EPDM seal is overmolded on the metal frame.

6. The electric battery housing as claimed in claim 1, wherein a total length of the metal frame is less than or equal to the total length of the EPDM seal.

7. The electric battery housing as claimed in claim 6, wherein the total length of the metal frame is strictly less than that of the EPDM seal, so that said metal frame appears discontinuous along said EPDM seal.

8. The electric battery housing as claimed in claim 7, wherein the EPDM seal has zones without any metal frame, and said zones each comprise a main segment linking two zones having the metal frame, and at least one secondary segment crossing the main segment by being at right angles thereto.

9. The electric battery housing as claimed in claim 8, wherein each zone of the EPDM seal which is without any metal frame has three parallel secondary segments crossing the main segment by being at right angles thereto.

10. The electric battery housing as claimed in claim 1, wherein the metal frame is produced in a metal to be chosen from among steel and aluminum.

* * * * *